(12) United States Patent
Dickens (10) Patent No.: US 8,827,670 B2
(45) Date of Patent: Sep. 9, 2014

(54) DUAL PLATEN MOLDING MACHINE

(75) Inventor: Luther I. Dickens, Radford, VA (US)

(73) Assignee: Radva Corporation, Radford, VA (US)

( * ) Notice: Subject to any disclaimer, the term of this patent is extended or adjusted under 35 U.S.C. 154(b) by 0 days.

(21) Appl. No.: 13/181,195

(22) Filed: Jul. 12, 2011

(65) Prior Publication Data

US 2011/0268924 A1    Nov. 3, 2011

Related U.S. Application Data

(63) Continuation of application No. PCT/US2010/022380, filed on Jan. 28, 2010.

(60) Provisional application No. 61/148,267, filed on Jan. 29, 2009.

(51) Int. Cl.
*B29C 44/44* (2006.01)
*B29C 44/58* (2006.01)
*B29C 43/42* (2006.01)
*B29C 43/04* (2006.01)

(52) U.S. Cl.
CPC ............... *B29C 43/04* (2013.01); *B29C 43/42* (2013.01); *Y10S 425/812* (2013.01); *Y10S 425/817* (2013.01)
USPC ........ 425/4 R; 425/151; 425/192 R; 425/443; 425/447; 425/543; 425/550; 425/581; 425/588; 425/812; 425/817 R; 249/81; 249/113; 249/123; 249/124; 249/126

(58) Field of Classification Search
USPC ...... 425/4 R, 817 R, 588, 149, 151, 153, 185, 425/186, 256, 412, 450.1, 468, 542, 543, 425/544, 812, 3, 121, 125, 143, 144, 192 R, 425/441, 443, 447, 449, 451, 550, 580, 425/581; 249/52, 63, 81, 101, 119, 122, 249/124, 142, 79, 112, 113, 126; 264/40.5, 264/50, 51, 79, 332
See application file for complete search history.

(56) References Cited

U.S. PATENT DOCUMENTS 2,582,161 A * 1/1952 Randall .................. 425/424
3,141,192 A * 7/1964 Benedetto ............... 425/451
(Continued)

FOREIGN PATENT DOCUMENTS

JP    2005-154555    6/2005

OTHER PUBLICATIONS

Notification of Transmittal of the International Search Report and the Written Opinion of the International Searching Authority, or the Declaration dated Aug. 17, 2010 in the corresponding PCT International Application No. PCT/US2010/022380.

*Primary Examiner* — Seyed Masoud Malekzadeh
(74) *Attorney, Agent, or Firm* — McGuireWoods LLP (57) ABSTRACT

A dual platen molding machine for constructing a plurality of pre-insulated structural panels is disclosed that includes multiple safety features. The molding machine produces one or more panels that may include one or more c-channels or profiles embedded in expandable polystyrene (EPS) foam to provide structural integrity to the panels, and resulting wall. A chase may be formed horizontally in the panels to provide a wiring conduit through the panel. The molding machine is electrically operated to control the movement of a movable molding portion when closed upon a stationary molding portion. Steam may be controlled to fuse insulating material such as expandable polystyrene (EPS) in cavities formed between the movable mold and the stationary mold. No hydraulics is required to operate the dual platen molding machine, thus improving operating and maintenance costs. Moreover, steam hoses may be avoided, thereby improving overall safety.

34 Claims, 9 Drawing Sheets

(56) References Cited

U.S. PATENT DOCUMENTS

| | | | | |
|---|---|---|---|---|
| 3,704,081 A * | 11/1972 | Immel | | 425/4 R |
| 3,737,266 A * | 6/1973 | Yamamoto | | 249/14 |
| 3,825,378 A * | 7/1974 | Dart et al. | | 425/4 R |
| 3,837,769 A * | 9/1974 | Erlenbach | | 425/4 R |
| 3,912,430 A * | 10/1975 | Noel | | 425/4 R |
| 3,941,528 A * | 3/1976 | Cotterell | | 425/4 R |
| 4,192,638 A * | 3/1980 | Lezier et al. | | 425/256 |
| 4,275,539 A * | 6/1981 | Abbott, III | | 52/309.11 |
| 4,298,324 A * | 11/1981 | Soulier | | 425/174.8 E |
| 4,327,045 A * | 4/1982 | Nishikawa et al. | | 264/51 |
| 4,333,897 A * | 6/1982 | Hayashi et al. | | 264/40.6 |
| 4,439,122 A * | 3/1984 | Besse et al. | | 425/4 R |
| 4,440,703 A * | 4/1984 | Akiyama et al. | | 264/50 |
| 4,456,573 A * | 6/1984 | Ragazzini et al. | | 264/53 |
| 4,482,306 A * | 11/1984 | Hahn | | 425/4 R |
| 4,492,663 A * | 1/1985 | Reinfeld et al. | | 264/45.4 |
| 4,557,881 A * | 12/1985 | Rabotski | | 264/40.4 |
| 4,627,946 A * | 12/1986 | Crabtree | | 264/51 |
| 4,653,718 A * | 3/1987 | Dickens | | 249/95 |
| 4,695,416 A * | 9/1987 | Treffner et al. | | 264/45.4 |
| 4,698,191 A * | 10/1987 | Endo et al. | | 264/50 |
| 4,756,859 A * | 7/1988 | Cretti | | 264/45.4 |
| 4,781,555 A * | 11/1988 | Cook | | 425/4 R |
| 4,800,050 A * | 1/1989 | Hahn et al. | | 264/40.6 |
| 4,813,859 A * | 3/1989 | Bullard et al. | | 425/4 R |
| 4,818,451 A * | 4/1989 | Arai et al. | | 264/40.3 |
| 5,037,592 A * | 8/1991 | Erlenbach | | 264/51 |
| 5,062,610 A * | 11/1991 | Woolford et al. | | 249/52 |
| 5,085,814 A * | 2/1992 | Kamiyama et al. | | 264/126 |
| 5,100,597 A * | 3/1992 | Erlenbach | | 264/51 |
| 5,304,050 A * | 4/1994 | Vismara | | 425/4 R |
| 5,328,345 A * | 7/1994 | Yamamoto et al. | | 425/4 R |
| 5,358,214 A * | 10/1994 | Batlle | | 249/142 |
| 5,370,515 A * | 12/1994 | Bazzica | | 425/4 R |
| 5,454,703 A * | 10/1995 | Bishop | | 425/4 R |
| 5,460,497 A * | 10/1995 | Vismara | | 425/4 R |
| 5,464,582 A * | 11/1995 | Okano et al. | | 264/45.5 |
| 5,474,841 A * | 12/1995 | Matsuki et al. | | 428/304.4 |
| 5,527,174 A * | 6/1996 | Godin et al. | | 425/126.1 |
| 5,711,905 A * | 1/1998 | Behl | | 264/51 |
| 5,914,082 A * | 6/1999 | Harrison | | 264/251 |
| 5,927,032 A * | 7/1999 | Record | | 52/309.11 |
| 5,939,004 A * | 8/1999 | Harrison | | 264/251 |
| 6,045,345 A * | 4/2000 | Eder et al. | | 425/4 R |
| 6,063,460 A | 5/2000 | Souders et al. | | |
| 6,129,871 A * | 10/2000 | Suzuki et al. | | 264/51 |
| 6,261,489 B1 * | 7/2001 | Matsuki et al. | | 264/45.4 |
| 6,312,197 B1 * | 11/2001 | Woolford et al. | | 405/286 |
| 6,361,725 B1 * | 3/2002 | Sinsley | | 264/87 |
| 6,454,553 B1 * | 9/2002 | Zobel | | 425/4 R |
| 6,527,993 B1 * | 3/2003 | Hirai et al. | | 264/50 |
| 6,558,592 B1 * | 5/2003 | Nohara et al. | | 264/51 |
| 6,619,943 B1 * | 9/2003 | Sameshima et al. | | 425/130 |
| 6,676,862 B2 * | 1/2004 | Jensen | | 264/39 |
| 6,800,227 B1 * | 10/2004 | Nohara et al. | | 264/51 |
| 6,843,461 B2 * | 1/2005 | Braungardt et al. | | 249/63 |
| 7,070,720 B2 * | 7/2006 | Nohara et al. | | 264/40.3 |
| 7,172,404 B2 * | 2/2007 | Braungardt et al. | | 425/444 |
| 7,294,295 B2 * | 11/2007 | Sakamoto et al. | | 264/40.6 |
| 7,942,658 B1 * | 5/2011 | Jensen | | 425/4 R |
| 2002/0195736 A1 * | 12/2002 | Potter | | 264/51 |
| 2003/0024192 A1 | 2/2003 | Spargur | | |
| 2003/0039800 A1 * | 2/2003 | Nohara et al. | | 428/71 |
| 2003/0059596 A1 * | 3/2003 | Nohara et al. | | 428/304.4 |
| 2003/0094722 A1 * | 5/2003 | Matsuki et al. | | 264/45.4 |
| 2004/0070106 A1 * | 4/2004 | Harrington | | 264/227 |
| 2004/0234636 A1 * | 11/2004 | Murata et al. | | 425/4 R |
| 2004/0251570 A1 * | 12/2004 | Sakamoto et al. | | 264/40.6 |
| 2005/0019439 A1 * | 1/2005 | Matsuki et al. | | 425/4 R |
| 2005/0136146 A1 * | 6/2005 | Pham | | 425/129.1 |
| 2006/0182840 A1 * | 8/2006 | High et al. | | 425/432 |
| 2008/0272510 A1 * | 11/2008 | Buckle et al. | | 264/50 |

\* cited by examiner

DUAL PLATEN MOLDING MACHINE

CROSS-REFERENCE TO RELATED APPLICATIONS

This is a continuation of PCT/US2010/022380, filed Jan. 28, 2010, which claims priority to U.S. Provisional Application No. 61/148,267, filed Jan. 29, 2009, the disclosures of which are now incorporated herein by reference in their entirety.

BACKGROUND OF THE INVENTION

1. Field of the Invention

The invention is directed generally to a method and apparatus for a dual platen molding machine. More particularly, the invention is directed to a dual platen molding machine configured to produce pre-insulated structural building panels configured with vertical support members, among other aspects.

2. Related Art

Various types of molding machines for production of pre-manufactured building components such as insulated building panels typically are produced in rather limited stackable configurations. Some of these building components may include expandable polystyrene foam (EPS). The EPS material may provide thermal insulating properties to a degree related to the thickness of the EPS material.

Since these currently available insulated building components are often of relatively small size, multiple building components may be required to create a vertical dimension in the height of a wall, which may require extra installation time and costs.

To date, the molding machines that have been constructed to produce these types of insulated building components are configured to produce these relatively small limited building panels, and the molding machines are usually based on relatively expensive technology to operate and maintain such as hydraulics, for example. The molding machines that currently exist typically produce a single panel per molding cycle, which is a significant production throughput constraint. Moreover, the configuration of the currently available molding machines does not permit construction of insulated panels with building construction aids such as for electrical wiring; nor do the molding machines typically provide for inter-panel structural support members and related features. In addition, the safety features for operators of a molding machine for producing the insulated building panels have been rather limited.

Accordingly, there is a need for a method and apparatus that provides for construction of more than one pre-insulated building panel of increased size with improved features to reduce installation costs and time, while providing improved structural integrity to the resulting wall.

SUMMARY OF THE INVENTION

The invention meets the foregoing need and includes providing a molding machine for constructing a pre-insulated structural panel that includes vertical c-channels or profiles spaced apart for imparting structural integrity to the panel and the c-channels embedded in EPS foam to create the panel. One edge of the panel may be configured with a tongue shaped edge that runs along one side of the panel. On the other edge of the panel a groove shaped edge may be formed to mate with the tongue shaped edge of another panel when two panels are arranged side-by-side to form a wall section.

In one aspect, an apparatus for molding a pre-insulated building component includes a stationary mold and a movable mold configured to engage the stationary mold to create a plurality of cavities configured to receive fusable insulating material wherein at least one of the movable mold and the stationary mold is configured with steam vents, and wherein the steam vents are configured to provide steam into the plurality of cavities to fuse the fusable insulating material to create a building panel with fused insulating material.

In another aspect, an apparatus for molding a pre-insulated building component is provided and includes an apparatus for molding a pre-insulated building component including first means for fusing insulating material by steam, second means for fusing the insulating material by steam, wherein engaging the first means with the second means forms a plurality of molding cavities, means for filling the formed plurality of cavities with fusable insulating material and means for controlling the fusing of the insulating material within the plurality of molding cavities using steam to create a plurality of insulated building panels during a molding cycle.

In yet another aspect, a method of molding pre-insulated building panels, includes providing a stationary mold configured with steam vents and providing a movable mold configured to engage the stationary mold to create a plurality of cavities, at least one cavity created on opposite sides of the stationary mold, the cavities configured to receive fusable insulating material, the movable mold configured with steam vents, wherein the steam vents are configured to provide steam into the plurality of cavities to fuse the fusable insulating material to create a building panel with fused insulating material.

In another aspect, an apparatus for molding a pre-insulated building component includes a movable mold portion configured to engage a stationary mold portion, the stationary mold portion configured to receive the movable mold portion to create a plurality of mold cavities therebetween for molding at least one pre-insulated building panel, at least one insulating material injector to fill at least one of the plurality of mold cavities and a plurality of steam holes in the stationary mold to provide steam to fuse the insulating material creating the at least one pre-insulated building panel.

The insulating material comprises expandable polystyrene (EPS). The movable mold portion may straddle the stationary mold when in a closed position creating a mold cavity on both sides of the stationary mold portion. The movable mold may be moved using electric motors.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention, are incorporated in and constitute a part of this specification, illustrate embodiments of the invention and, together with the detailed description, serve to explain the principles of the invention. No attempt is made to show structural details of the invention in more detail than may be necessary for a fundamental understanding of the invention and the various ways in which it may be practiced. In the drawings.

DETAILED DESCRIPTION OF THE INVENTION

The embodiments of the invention and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the invention. The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law. Moreover, it is noted that like reference numerals represent similar parts throughout the several views of the drawings.

Figure 1:
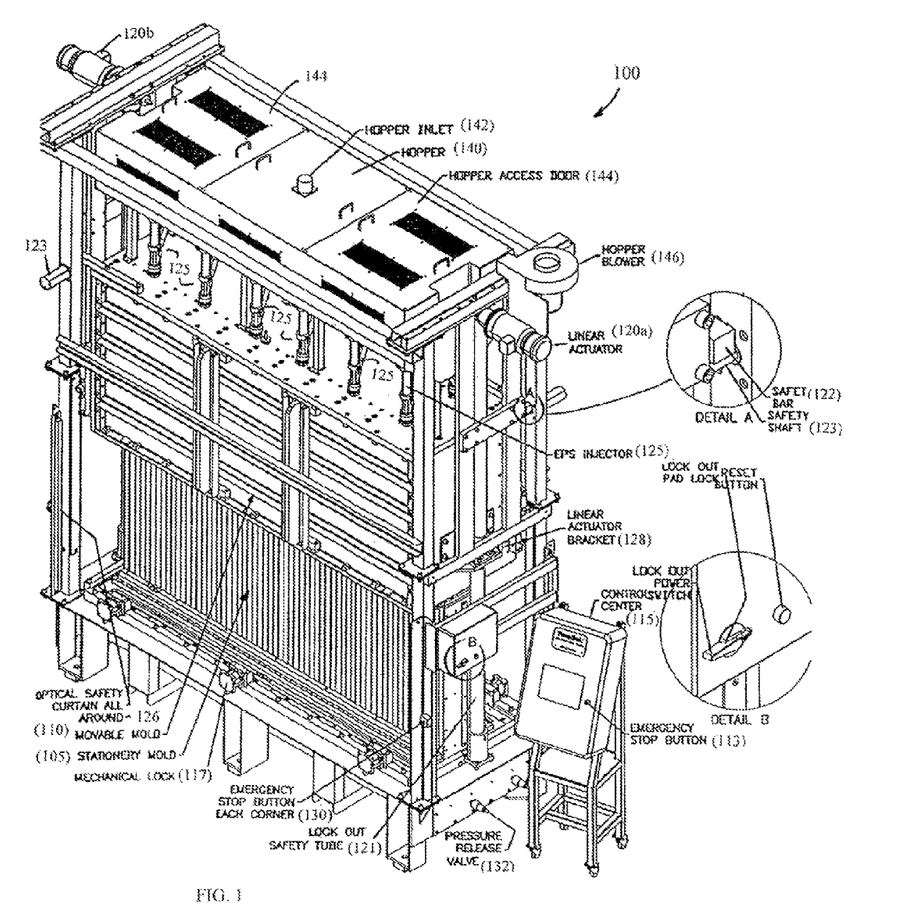
FIG. 1 is a front perspective view of a molding machine for producing pre-insulated structural building panels, constructed according to principles of the invention.

FIG. 1 is a front perspective view of a dual platen molding machine for producing pre-insulated structural building panels, constructed according to principles of the invention, generally denoted by reference numeral 100. (FIG. 1 may be viewed together with of FIGS. 5C, 5D, which generally illustrate in a simplified manner, a stationary mold 105 mated with a corresponding movable mold 110). The dual platen molding machine 100 comprises a stationary mold 105 having two outer surfaces (FIG. 5C, shown as outer surfaces 202, 203) directly involved in the molding of panels 190a, 190b, and a vertically movable mold 110 having at least two inner surfaces (FIG. 5C, shown as inner surfaces 103, 104) directly involved in the forming of panels 190a, 190b; each mold 105, 110 is described more fully below in relation to FIGS. 4, 5A, 5B and 5C.

In one aspect, the stationary mold 105 may be considered a male portion and the movable mold 110 portion may be considered a female portion, and when mated by moving the movable mold 110 downward to enclose the stationary mold 105 (i.e., when in a "closed" position for actual panel molding), a plurality of molding cavities 107a, 107b (FIG. 5C) may be created therebetween (i.e., molding cavities 107a, 170b may be created simultaneously on both lateral sides of the dual platen molding machine 100). The movable mold 110 portion may be configured to straddle the stationary mold 105 portion when in a closed position creating a mold cavity on both sides (i.e., cavities 107a, 107b) of the stationary mold 105 portion.

Figures 5A, 5B:
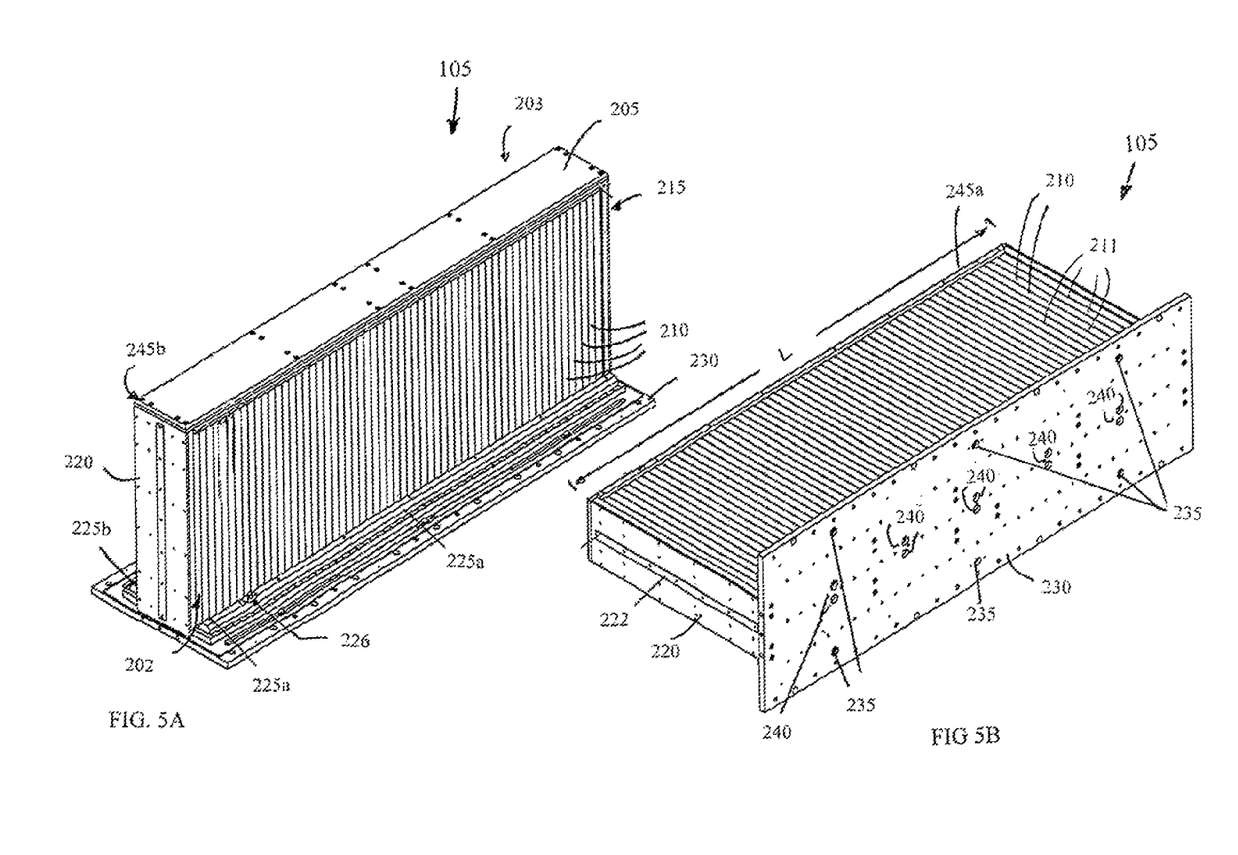
FIG. 5A is a front perspective view of the stationary mold of FIG. 1.
FIG. 5B is a bottom perspective view of the stationary mold of FIG. 1.
Figure 5C:
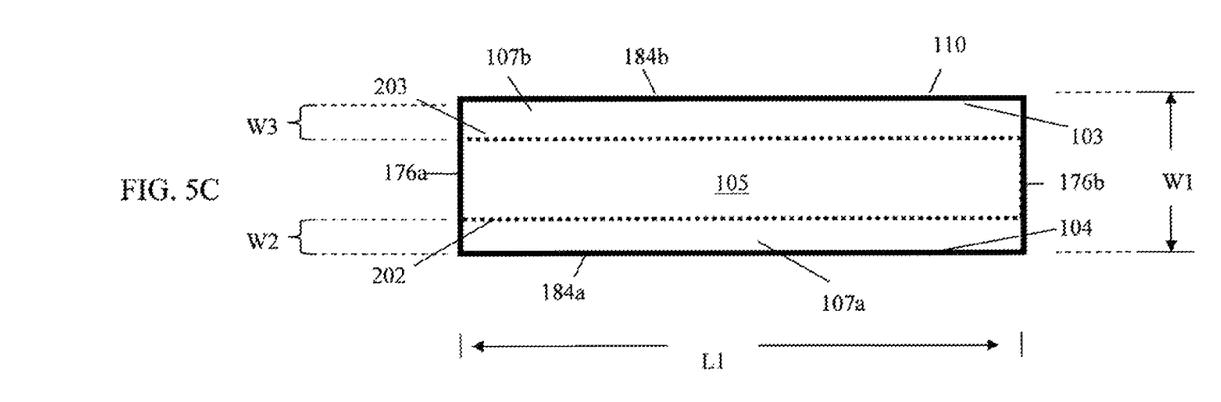
FIG. 5C is a simplified top view block diagram of the stationary mold and movable mold of FIG. 1, shown as a combined configuration and showing molding cavities created by the combination, according to principles of the invention.

Referring to FIG. 5C, which is a top view simplified block diagram showing the relationship of the stationary mold 105 and the movable mold 110 when in a mated configuration, the first cavity 107a may be formed when the movable mold 110 is lowered onto the stationary mold 105 wherein the first cavity 107a may be defined between the inner wall 104 of the movable mold 110 and the outer wall 202 of the stationary mold 105. Likewise, the second cavity 107b may be formed simultaneously when the movable mold 110 is lowered onto the stationary mold 105 wherein the second cavity 107b may be defined between the an inner surface of wall 103 of the movable mold 110 and the outer surface of wall 203 of the stationary mold 105. End walls 176a, 176b also provide respective side walls inner walls of the movable mold 110 for forming the respective cavities 107a, 107b. The end walls comprising a first end wall 176a and a second end wall 176b, both end walls may be configured with vertical core tubes 210 for venting steam into cavities 107a, 107b.

The movable mold 110 may have opposing side walls (i.e., a first wall and a second wall), perhaps with steam vents formed therein, and when engaged with the stationary mold 105 (that may have two walls, perhaps configured with steam vents), a plurality of cavities such as cavities 107a, 107b may be formed on both sides of the stationary mold 105, with a first wall of the stationary mold 105 and a first wall of the movable mold 110 configured to form at least in part a first cavity (e.g., cavity 107a); while a second wall of the stationary mold 105 and a second wall of the movable mold 110 may be configured to form at least in part a second cavity (e.g., cavity 107b). The first and second cavities may be configured on opposite sides of the stationary mold 105.

Figure 2:
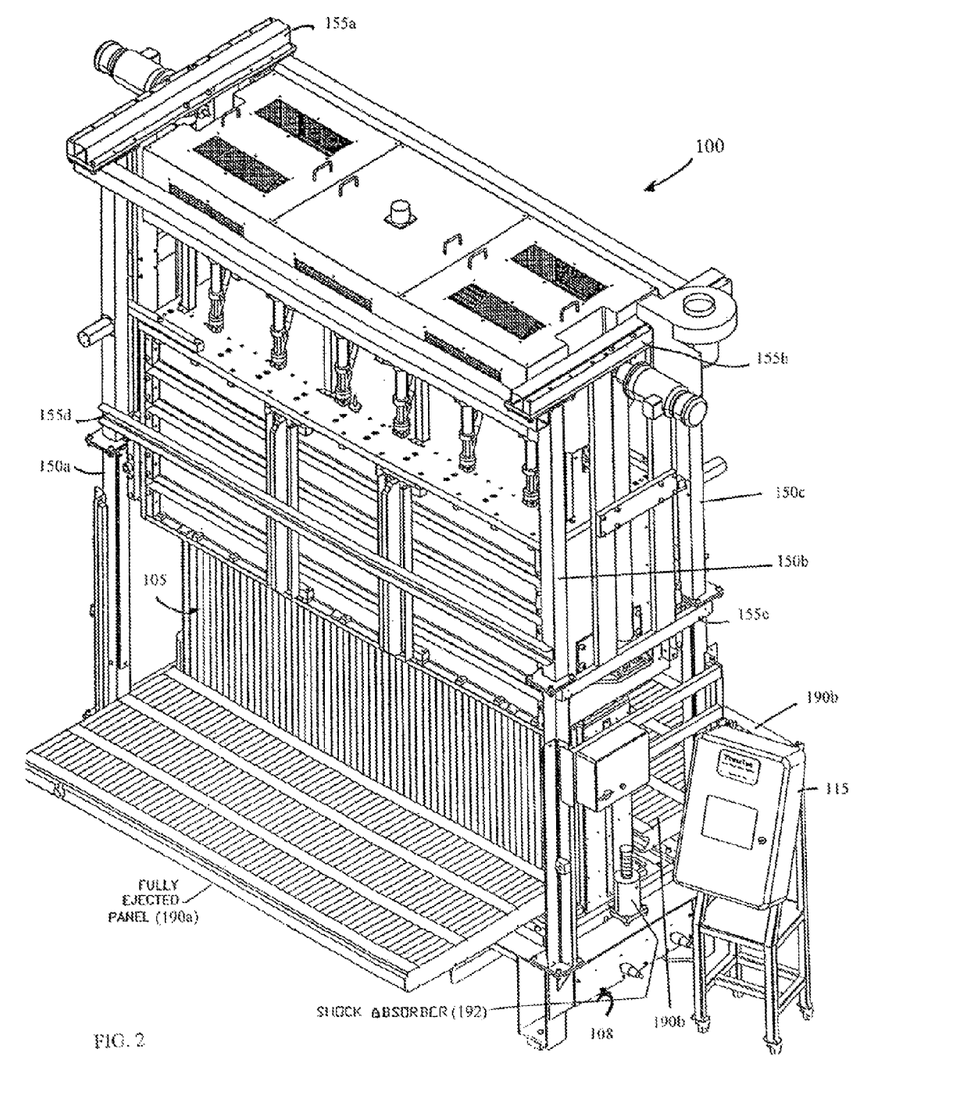
FIG. 2 is another front perspective the molding machine of FIG. 1 showing additional features and also showing two pre-insulated building panels produced by the dual platen molding machine.
Figure 3:
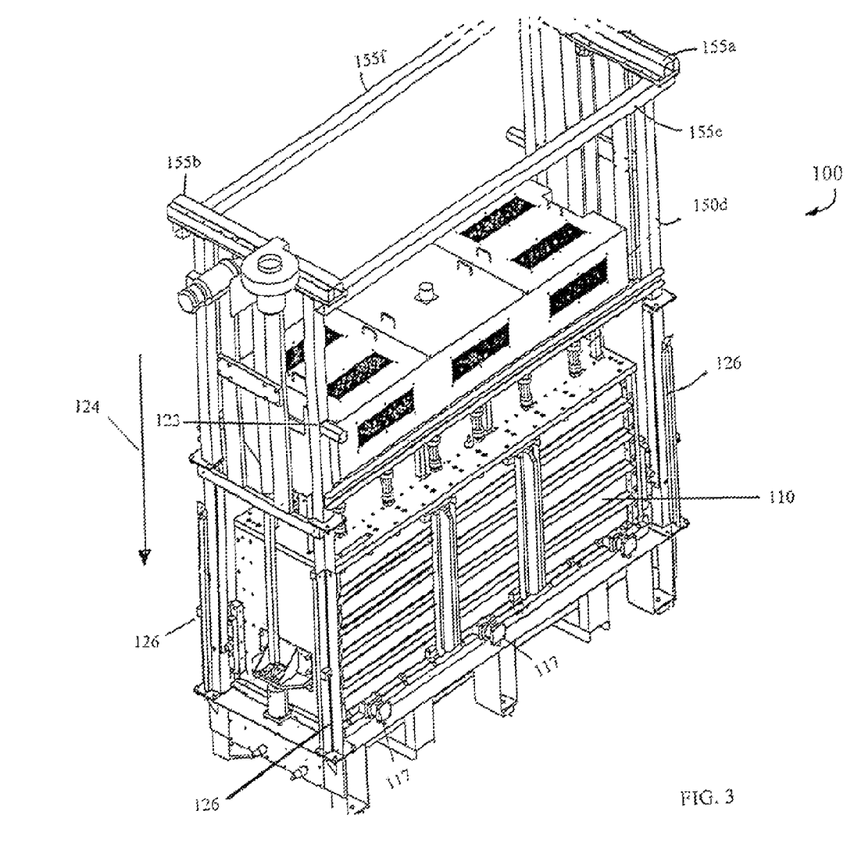
FIG. 3 is a partial rear perspective view of the molding machine of FIG. 1.

The movable mold 110 is shown in a raised position in FIG. 1, while FIG. 3 shows the movable mold 110 in a down position for actual molding operations to mold pre-insulated building panels 190a, 190b (FIG. 2), described more fully below. When the movable mold 110 is in the down position, a plurality of valves (not shown) at the lower region of the stationary mold 105 may be automatically opened (actuated) by the weight or presence of the movable mold 110 against lower portions of the stationary mold 105 thereby permitting a flow of steam into the formed cavities 107a, 107b and/or into the hollow interior portions of stationary mold 105, described more fully below. Steam may be provided by inlet valves (not shown) proximate the lower portion of the stationary mold 105. Moreover, one or more pressure release valves 132, which may be constructed as part of the steam chest, may provide for release of steam pressure as necessary during or after molding operations.

The dual platen molding machine 100 may include electrically powered controls, including linear actuators 120a, 120b, to raise and lower the movable mold 110. This technique avoids hydraulic type activation and related configurations currently prevalent in the molding industry. By avoiding hydraulics and using electric motorization instead, initial capital costs are lower and ongoing maintenance costs are much lower since hydraulic implementations tend to require much more expensive components and more ongoing maintenance. Moreover, steam hoses may be substantially avoided that are typically found in many molding operations of the prior art, thereby significantly improving overall safety.

The dual platen molding machine 100 further may comprise vertical support members proximate each of the four corners of the dual platen molding machine 100 including vertical support members 150a-150d (FIGS. 2 and/or 3) to support the various molding components such as movable mold 110, hopper 140, and related components. The vertical support members 150a-150d may comprise at least in part a frame configured to guide the movable mold 110 to engage the stationary mold 105. The movable mold may be propelled using electric motors. Also, a plurality of horizontal members, such as members 155a-f may provide horizontal structural integrity for the dual platen molding machine 100, as well as axial support.

The dual platen molding machine 100 further may comprise the hopper 140 having a hopper inlet 142 and hopper access doors 144. The hopper 140 may be configured to receive and store free flowing insulating materials such as expandable polystyrene (EPS) for eventual use in the molding process of the pre-insulated structural building panels 190a, 190b, shown more fully in relation to FIG. 6A-6D. A hopper blower 146 may provide for movement of the free flowing insulating materials within the dual platen molding machine 100. Injectors 125, which may be an EPS injector, may provide conduits for delivery of the free flowing unfused insulating materials such as EPS from the hopper 140 to the plurality of molding cavities 107a, 107b formed by stationary mold 105 and the movable mold 110. The injectors 125, at least in part, provide for filling the formed plurality of cavities with fusable insulating material. In alternate embodiments, a pressure pot may be used to deliver free flowing unfused insulating material such as EPS in lieu of the hopper 140 arrangement.

A control center 115 may provide an operator interface for programming molding operations, which may be independently programmed for each molding operational side of the dual platen molding machine 100. The control center 115 permits programming of various operational parameters such as, for example, temperature of the steam used in the molding operation to fuse the molding material such as EPS, time periods for each molding step, air pressure such as for ejecting the molded panels and/or for purging water from the molding cavity. The control center 115, at least in part, is configured to provide for controlling the fusing of the insulating material within the plurality of molding cavities using steam to create a plurality of insulated building panels during a molding cycle. Manual control of certain functions may be provided such as opening and closing the molds (i.e., raising and lowering the movable mold). An emergency stop button 113 may also be provided to stop operations quickly. Also, a series of emergency stop buttons 130 may be positioned at a strategic location such as at a plurality of corner of the molding machine 100.

The movable mold 110 may be held in a raised position for safety reasons, such as when performing maintenance or re-configuration of molding features, by safety bar 122 and safety shaft 123 at each end of the dual platen molding machine 100, the safety shaft 123 may be manually engaged, as needed. When engaged, the safety bar 122 supports the movable mold 110 and prevents inadvertent downward movement. Conversely, the safety bar 123 is removed when active molding operations take place, thereby permitting the movable mold to be lowered to enclose the stationary mold 105. Further, for similar reasons, a safety tube 121 may also be engaged in a vertical fashion in a safety position to also assist in preventing downward movement of the movable mold 110.

As an added safety measure, one or more mechanical locks 117 may lock the movable mold 110 in place while in the closed position to prevent movement of the movable mold 110 while molding operations are in process. The mechanical locks 117 are configured to hold down the movable mold 110 to resist and/or prevent the steam pressures within the molding cavities 107a, 107b from raising the movable mold 110. Several additional safety features may be provided by the dual platen molding machine 100 to increase safety of operation. For example, an optical safety curtain component 126 placed proximate to each of the four corners (three of the four components 126 are shown in FIG. 3) of the dual platen molding machine 100 provides added safety protection by detecting blockage of the light beams configured to detect intrusion during molding operations and/or during movement of the movable mold 110. That is, the optical safety curtain may be configured to detect a safety violation.

Once armed, if the optical safety curtain 126 detects a break in the light beam, safety programming may be initiated to stop movement of the movable mold 110, for example, and curtailment of further molding operations may be initiated, as pre-programmed.

Moreover, a lock-out power switch and reset button as shown in detail "B" (FIG. 1), also may provide direct access by an operator to reset the dual platen machine and/or lock-out any electronic controls to prevent any or select operations of the machine 100. Further, an emergency stop button 113 may be used by an operator to stop the molding operations, for whatever reason may necessitate such an action.

FIG. 2 is a perspective view of a dual platen molding machine of FIG. 1, but showing additional features, and also showing finished and ejected pre-insulated building panels 190a, 190b produced by the dual platen molding machine. The pre-insulated panels 190a and 190b are shown ejected from the dual platen molding machine 100 and laying horizontally. The orientation of the panels 190a, 190b in FIG. 2 is illustrative and may not necessarily be ejected in such a horizontal manner; rather the panels 190a, 190b might be directly removed from the molding machine 100 while still in a vertical orientation after a molding cycle, and the movable mold 110 raised so that an operator might have access to the panels 190a, 190b. The pre-insulated panel 190a, 190b is described more fully in relation to FIGS. 6A-6D, below.

Also shown in FIG. 2 are vertical support members 150a-150c (150d is shown in FIG. 3) and a plurality of horizontal members, such as members 155a-f configured to provide horizontal structural integrity. At least one shock absorber 192 may provide a damping effect if the movable mold 110 is closed too quickly or in an uncontrolled manner, e.g., in an emergency type failure to prevent damage to the molds and machinery. The safety tube 121 (described previously) may be configured to be removably mountable to this shock absorber 192, such as during maintenance or reconfiguration periods.

A steam chest 108 may be configured along the bottom side of the dual platen machine 100 and along its length for providing steam for use during the molding operations. The steam chest 108 may be mated or attached to the bottom of the stationary mold 105. An external steam source (not shown) may be attached to the steam chest 108 for providing steam for use during the molding operation. Moreover, a steam exhaust (not shown) may be configured in the steam chest 108 to recover residual steam and/or water.

FIG. 3 is a partial rear perspective view of the dual platen molding machine of FIG. 1. FIG. 3 also shows the movable mold 110 in a closed position, i.e., down position. The stationary mold 105 is obscured by the movable mold 110 in FIG. 3 since the movable mold is shown in a closed position, such as when in an active molding operation. The hopper 140 is shown as being lowered also along with the movable mold 110 since they are configured to be in operational proximity to one another in this embodiment. FIG. 3 also shows the optical light curtain components 126. Safety shaft 123 is shown as being configured in a disengaged position to permit downward movement (represented by arrow 124) of the movable mold 110.

Figure 4:
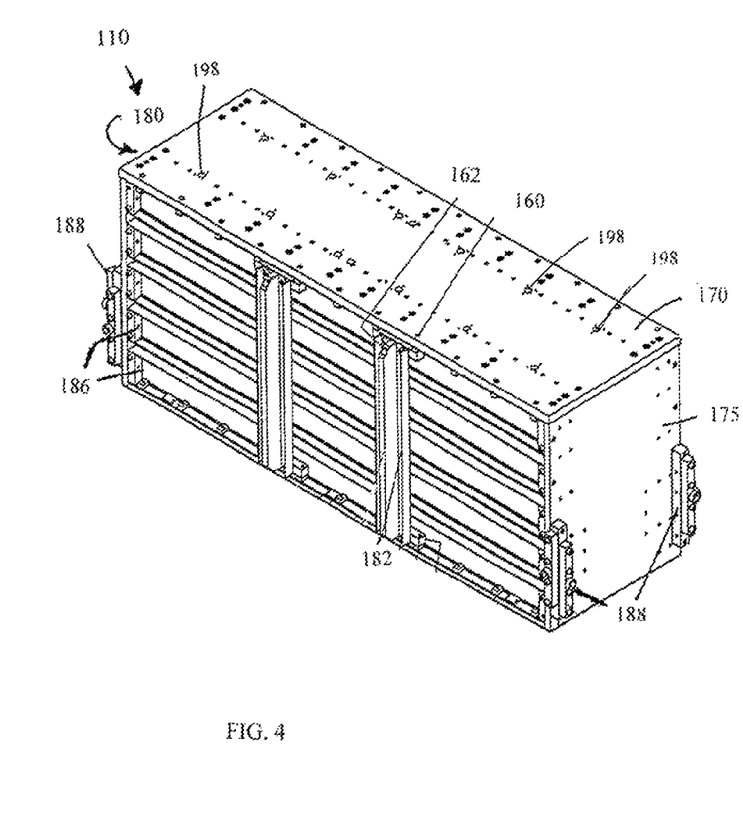
FIG. 4 is a front perspective view of the movable mold of FIG. 1, constructed according to principles of the invention.

FIG. 4 is a front perspective view of the movable mold of FIG. 1, showing more detail. The movable mold 110 may include a plurality of side gussets 186 to reinforce the longer outer walls 184a, 184b of the movable mold 110. The side gussets 186 may be held in place by one or more channels 182, perhaps each with a stiffener 162, providing structural support. End caps 175, 180 may form the end walls of the movable mold 110. Each end cap 175, 180 may include guides 188 to provide for guiding of the movable mold 110 during raising and lowering in guide rails proximate vertical support members 150a-150d of the dual paten molding machine 100. A top cap 170 may mate with the end caps 175, 180 and together with outer walls 184a, 184b are configured to form a female cavity there within and configured to mate with the male shaped stationary mold 105, described previously and more fully below, thereby when mated forming a plurality of molding cavities 107a, 107b therein, formed along the length L (FIG. 5C) of the movable mold 110 and stationary mold 105. Screws 160, or similar retaining mechanism, may be employed to fasten some or all the parts of the movable mold 110 together. A plurality of free flowing insulating material openings 198 may be formed in the top cap 170 to permit placement or injection by injectors 125 of the unfused free flowing insulating material such as EPS into the dynamically formed cavities within.

FIG. 5A is a front perspective view of the stationary mold of FIG. 1 and FIG. 5B is a bottom perspective of the same stationary mold. A back view (not shown) may substantially mirror the front view, with like construction and corresponding elements as described for the front view. The stationary mold 105 may include a base 230 with a plurality of vertical core tubes 210 mounted thereupon. The vertical core tubes 210 may be arranged along both sides 202, 203 of the stationary mold 105. The plurality of vertical core tubes 210 each may be configured as a hollow tube approximately 4 inches square, for example, but may vary and may be rectangular in some embodiments. The plurality of vertical core tubes 210 may be configured to be held together by one or more tie rods (not shown) configured to run interiorly along substantially the length L of the stationary mold 105. End caps 215, 220 may be configured to hold the assembly together with the top cap 205 and base 230. The internally positioned tie rods (not shown) may be configured to connect to the end caps 215, 220, and may also be configured to hold the vertical core tubes 210 in place. A wear plate 220 (one on each end of the stationary mold 105) may be configured to engage and aid in positioning the movable mold 110 during operations. The wear plate 220 may be fastened to the respective end cap 215, 220 by a fastener 222.

The base 230 may be constructed with a plurality of steam holes 235, 240. The base 230 may be configured to rest upon a steam chest (not shown) positioned underneath the stationary mold 105. The steam holes 235 may be positioned to vent steam from the underlying steam chest (not shown) into the cavities 107a, 107b formed by the movable mold 110 when mated with the stationary mold 105, i.e., the cavities 107a, 107b formed therewithin when the movable mold 110 is in a closed position. The cavities 107a, 107b may also be configured to accept and hold free flowing insulating material such as EPS for fusing into a solid panel by the steam. Furthermore, the movable mold 110 may be configured (not shown) with vertical core tubes in a similar manner as the vertical core tubes 210 of the stationary mold 105, so that the steam may travel up the walls in the vertical core vents of the movable mold 110 for controlled release of steam into the cavities 107a, 107b, when the movable mold 110 is in a closed position and engaged with the stationary mold 105. The movable mold 110 may be configured with vertical core tubes on all four walls.

The plurality of steam holes 240 may vent steam into the vertical core tubes 210 on both sides of the stationary mold 105 for directing steam into the cavities 107a, 107b formed between the stationary mold 105 and the movable mold 110 along the height of the vertical extent and along the length of the cavities 107a, 107b thereby injecting steam under pressure into the formed cavity for providing a more uniformed distribution of heat to the unfused insulating material for fusing and construction of the pre-insulated building panels 190a, 190b. The plurality of vertical core tubes 210 on both sides of the stationary mold 105 may be configured with a plurality of vent holes 211 which may be formed in the vertical core tubes 210 and/or between such vertical core tubes 210 to permit flow of steam into the cavity to fuse the free flowing insulating material such as EPS. The plurality of vent holes 211 may be in the form of slits, but the shape of the opening may vary.

When the movable mold 110 is closed and engaged with the stationary mold 105 to create the plurality of cavities 107a, 107b, the cavities may be filled with free flowing unfused insulating material, such as unfused EPS. A series of steam valves (not shown) may be opened to permit steam from an underlying steam chest (not shown) to flow to the steam holes 235 and beyond into the vertical core tunes 210. That is, the steam may enter the movable mold 110 and stationary mold 105 core tubes. Once fusing has occurred of the insulating material within the cavities 107a, 107b, the movable mold 110 may be subsequently raised, and the steam valves may automatically close, stopping flow of the steam out of the underlying steam chest.

Figure 5D:
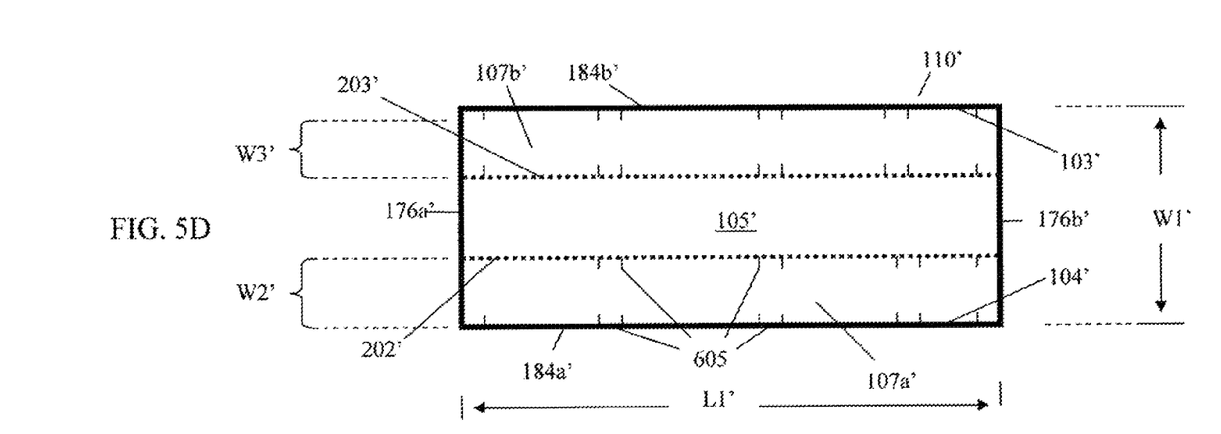
FIG. 5D is a simplified top view block diagram in accordance to the principles presented in relation to FIG. 5C, except showing that the certain dimensions or features may vary in embodiments to construct different size panels.

FIG. 5A further shows a plurality of tongues 225a, 225b configured to extend substantially along the length L of the stationary mold 105 and configured to form a bevel feature (see FIG. 6E, bevel shown as the concave curve shape of the groove side 620) into the insulating material (e.g., EPS) being fused at a first edge of the pre-insulted building panels 190*a*, 190*b*, shown more fully below in reference to FIGS. 6A-6G. Male tongues 245*a*, 245*b* may be configured to provide a portion of the generally convex contour to the second edge of the pre-insulated building panels 190*a*, 190*b* (shown in FIG. 6E as part of the convex contour related to the tongue side 610). A second male tongue(s) 212 (FIG. 5E) configured in shape similar to male tongues 245*a*, 245*b* may be positioned on an upper inner location of surfaces 103, 104 (FIGS. 5C, 5D and 5E) of the movable mold 110 to provide another portion of the generally convex contour to the opposite second edge of the pre-insulated panels 190*a*, 190*b*, thereby forming the entire convex contour related to the shape of the groove side 620. The convex contour is shown as having an optional flat portion 611 at the outermost edge of the tongue side 610 so that when the panels 190*a*, 190*b* are mated, a gap 613 may be created within the concave portion of panel edge 620 thereby forming an optional vertical chase along the extent and between two joined panels 190*a*, 190*b*. The male tongues 245*a*, 245*b* and second male tongue 212 may be altered in shape to either create such an optional gap 613, or may be configured in their shape so that the convex contour related to the tongue side 610 may mate snuggly with the concave contour of the groove side 620 (i.e., matched contours shown in reference to FIG. 6G). This matched shape (as shown by the example of FIG. 6G) may provide much greater thermal R-factor at the joint of two panels 190*a*, 190*b*, when compared with using a gap 613, as shown in FIG. 6F.

Moreover, a plurality of retaining sockets 226 being configured with at least one being a part of tongues 225*a*, 225*b*, to receive at least one elongated tube (not shown) of about length W (FIG. 5E, FIG. 6A) for forming at least one horizontal chase (see, e.g., FIG. 6B chase 630) into the pre-insulated building panels 190*a*, 190*b*. The at least one elongated tube may be manually placed into the retaining sockets 226 (and similarly on the opposite side of the dual platen machine 100) prior to molding operations, i.e., across the width W of the intended pre-insulated building panel 190*a*, 190*b*. The at least one elongated tube may be configured with threads or similar attaching mechanism at the upper end to be attached to the inner top surface of the movable mold 110 so that the at least one elongated tube moves along with the movable mold 110 as it is raised and lowered. The at least one elongated tube may be configured to align with the retaining socket 226 so they insert into the retaining sockets 226. The resultant formed horizontal chase 630 (horizontal referring to the direction of the chase when the panel is installed for use) permits running of wiring, for example, in and/or through the molded pre-insulated building panel 190*a*, 190*b*. The retaining sockets 226 may be moved along the tongues 225*a*, 226*b* to re-position or re-configure the resulting chase, as needed. Similarly, this configurable horizontal chase construction technique may exist on the opposite side of the stationary mold 105. Moreover, in some applications, two or more complete panels may be molded on the same side of the stationary mold 105 by use of inserts. So, it is possible to mold three, four or even more panels simultaneously by using appropriately configured inserts.

FIG. 5C is a simplified top view block diagram of the stationary mold and movable mold of FIG. 1, shown as a combined configuration and showing molding cavities created by the combination, according to principles of the invention. The movable mold 110 may have a length L1 and width W1 sufficient to enclose the stationary mold 105 therewithin. The stationary mold 105 may be configured with side walls 202, 203 each having an outer surface. The movable mold having walls 184*a* and 184*b* with inner surfaces 104 and 103 respectively. Cavities 107*a*, 107*b* are defined by the stationary mold 105 and movable mold 110 when mated for molding. Free flowing unfused insulating material such as EPS may be placed within these cavities 107*a*, 107*b*, via hopper 140 and injectors 125, for fusing by steam. FIG. 5D is a simplified top view block diagram in accordance to the principles presented in relation to FIG. 5C, except showing that the certain dimensions or features may vary in embodiments to construct different size panels. The features that may vary include those shown as primes (e.g., W1', W2', W3', 176*a*', 176*b*', 107*a*', 107*b*'190, 190*a*) FIG. 5D also shows additional details that include at least one vertical support element shown as c-channels 605 having lips arranged along walls 184*a*', 184*b*', 202 and 203 in exemplary positions for the molding process whereby free flowing unfused insulating material such as EPS may be fused and bonded to the vertical member, c-channels 605 during the molding cycle providing mutual strength to one another for producing substantial structural integrity and strength of a panel 190*a*, 190*b*. The vertical support elements, such as c-channels 605, may be coated or applied, on at least one of the surfaces to be in contact with the insulating materials such as EPS, with a heat activated adhesive prior to the fusing, usually as a separate step before the molding cycle, which imparts substantial bonding properties between the vertical support elements such as c-channels 605 and the fused insulating material such as EPS. Therefore, by configuring at least one vertical support element such as the c-channels 605 within at least one of the cavities 107*a*, 107*b* along an inner surface of at least one of the molds 105, 110, the heat activated adhesive may provide increased bonding strength between the at least one vertical support element and the fused insulating material during the molding process. This bonding provides substantial integrity, strength and durability to produced panels 190*a*, 190*b*. The c-channels 605 may be held in place magnetically or by retainers during the molding cycle. It should be apparent that the c-channels 605 may be included in FIG. 5C.

By way of an example, a different sized movable mold 110' and/or stationary mold 105' (i.e., a different size from movable mold 110 and/or stationary mold 105 of FIG. 5C) having different dimensions such as L1' and/or W1' may produce different size panels 190*a*, 190*b*. It should be noted that the stationary mold 105 may remain the same size in width as long as the length L of panel 190 is not to be changed. This is because a thickness "t" of a panel 190 (FIG. 6D) may be varied simply by changing the dimension of W1 of only the movable mold 110, thereby increasing or decreasing the size of W1 and/or W2, as needed. It is possible to change W2 to W2', for example, without changing the size of W3. Moreover, the plurality of tongues 225*a*, 225*b* and male tongues 245*a*, 245*b*, and similar related components, may be altered in dimension to accommodate the manufacturing of different sized panels, as needed.

Figure 5E:
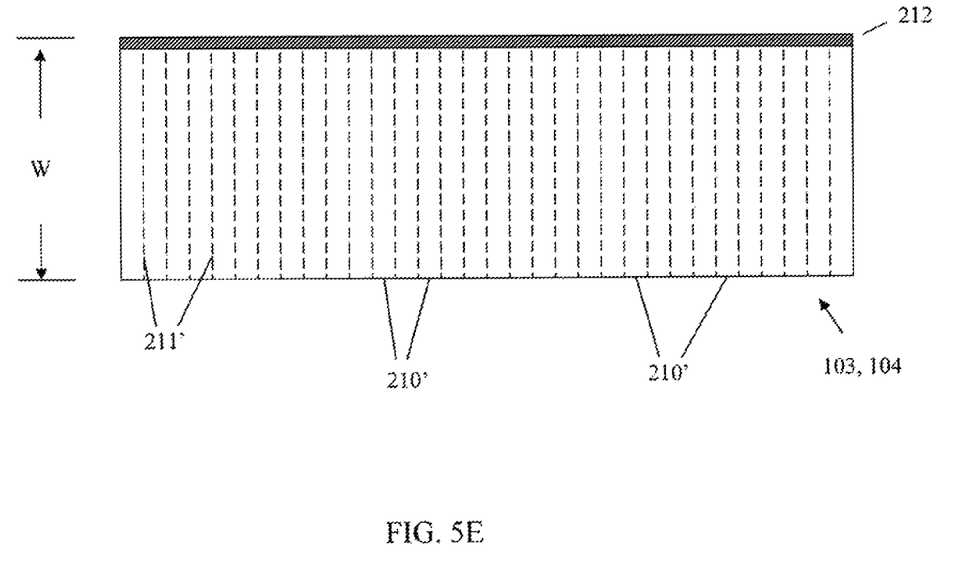
FIG. 5E is a side view of the respective inner surface of a wall of the movable mold of FIG. 4, constructed according to principles of the invention.
Figures 5F, 6F, 6G:
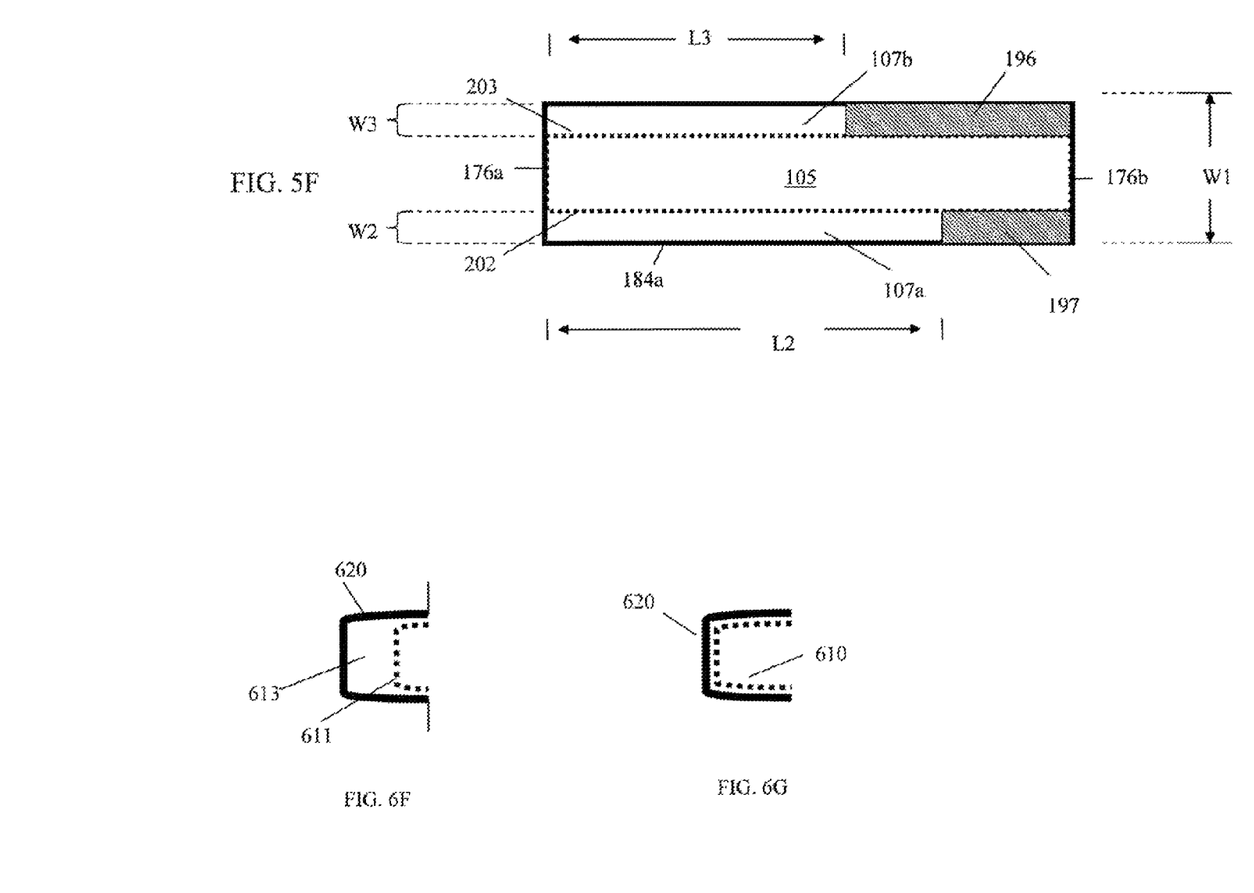
FIG. 5F is an embodiment of a simplified top view block diagram of an engaged stationary mold and a movable mold, showing different dimensioned cavities, configured according to principles of the invention.
FIGS. 6F and 6G illustrate different configurations of the contours that may be formed at the edge of building panels, according to principles of the invention.

FIG. 5E is a side view of the respective inner surface 103, 104 of the wall 184*a* or 184*b* of movable mold 110, constructed according to principles of the invention. The inner surface 103, 104 may have a width W that substantially matches the width W of a panel 190. A male tongue 212 is shown configured along the lateral extent of the inner surfaces 103, 104, positioned towards the upper or top end of the inner surfaces 103, 104. This male tongue forms a contour in the panel 190 during molding. This male tongue 212 is a partner to male tongue 245*a* or 245*b* that may be configured on the stationary mold 105. FIG. 5E also shows vertical core tubes 210' for venting steam through vent holes 211' from an underlying steam chest into the cavities 107*a*, 107*b* during molding to fuse the insulating material such as EPS. FIG. 5E also shows an elongated tube 207 that is used to create a horizontal chase. This elongated tube 207 is not a part of the wall 184a, 184b, but is shown to indicate a placement of such an elongated tube 207 during a molding process; the elongated tube 207 may be held in place by one or more retaining sockets 226 and attached to the top wall's inner surface (i.e., the ceiling surface) of the movable mold 110.

FIG. 5F is an embodiment of a simplified top view block diagram of a stationary mold and a movable mold, showing different dimensioned cavities configured according to principles of the invention. The cavities 107a, 107b are shown as different in size produced by the use of different sized inserts 196, 197. The inserts 196,197 may be configured to any size (or the same size) and configured to be connected to the stationary mold 105 during molding to produce the same or different sized panels 190. One or more inserts such as inserts 196, 197 may be attached to the stationary mold 105 by a connecting mechanism or by magnetic attachment. The inserts 196, 197 may be configured as metallic cages, for example, to reduce the volume of cavities 107a, 107b to a new volume. In this way different sized panels 190, such as shown by L2 and L3, may be made simultaneously during one molding cycle. The inserts 196, 197 may provide for a quick and simple technique for creating different sized cavities 107a, 107b, and may therefore provide for producing different sizes of panels 190 without changing out the stationary mold 105 or the movable mold 110, such as described in reference to FIGS. 5C and 5D, above.

Moreover, the thickness "t" of any panel 190 may be changed by use of a similar insert as inserts 196, 197, but may be configured to alter the shape and/or size of the cavities 107a, 107b to change the thickness "t" (FIG. 6D) of a resulting panel 190. This may involve an insert that may be configured to run along an extent of the stationary mold 105. The use of multiple inserts in combination, which may be of different dimensions, configured on one side (or perhaps both sides) of the stationary mold 105 is also contemplated for use in reducing the length and thickness of a produced panel 190.

Figures 6A, 6B, 6D, 6E:
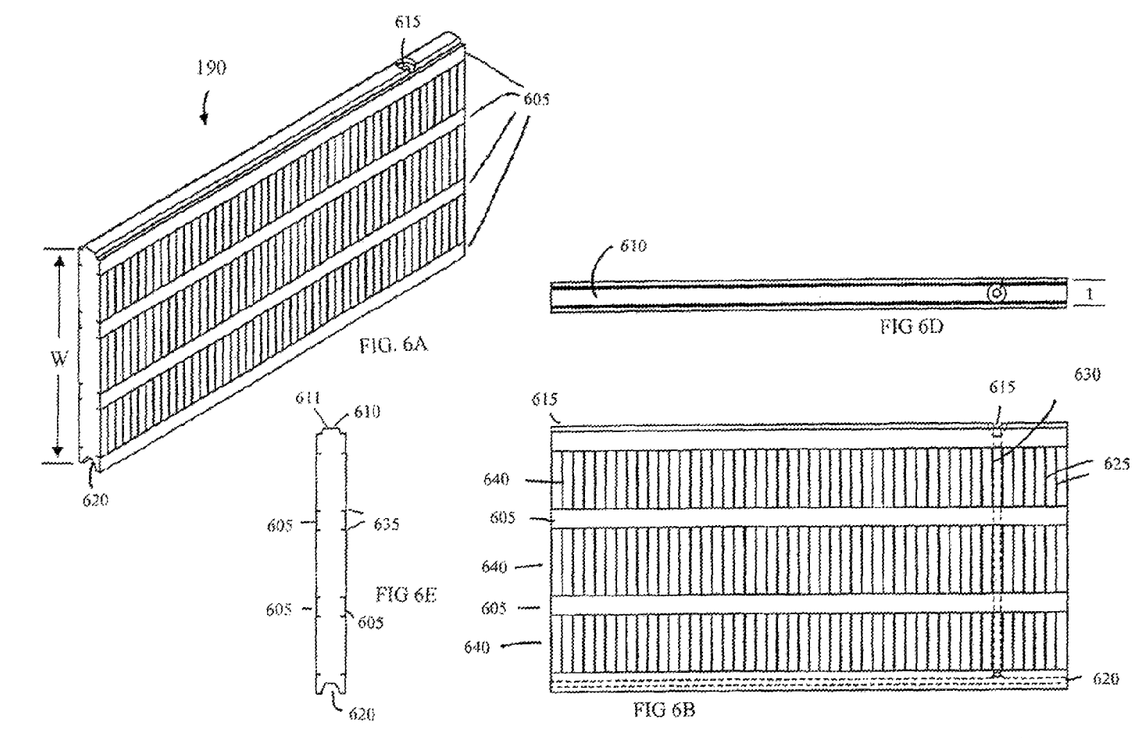
FIG. 6A is a perspective view of a pre-insulated structural building panel, constructed according to principles of the invention.
FIG. 6B is a side-view of the pre-insulated structural building panel of FIG. 6A.
FIG. 6D is a view of the opposite edge of pre-insulated structural building panel of FIG. 6A.
FIG. 6E is an end-view of the pre-insulated structural building panel of FIG. 6A.
Figure 6C:
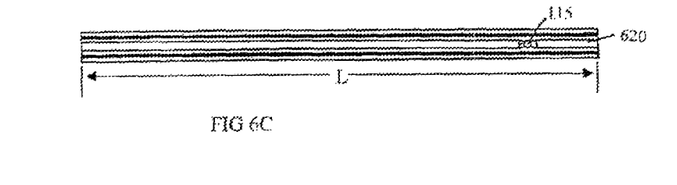
FIG. 6C is a side-view of an edge of the pre-insulated structural building panel of FIG. 6A.

FIG. 6A is a perspective view of a pre-insulated structural building panel, constructed according to principles of the invention, generally denoted by reference numeral 100. The panel 190 is shown oriented on its side in FIGS. 6A and 6B to reflect its typical orientation during manufacturing, however, when installed, the panel 190 would be rotated so that the c-channels 605 would run vertically. The pre-insulated structural building panel 190 may include a plurality of vertical support elements or channels such as c-channels 605 that run the extent of the length (L) of the panel 190. The panel 190 is typically installed with the length (L) oriented vertically. The plurality of c-channels 605 may comprise steel channels configured with lips 635 formed in the sides of the c-channels 605 configured to embed and secure the c-channels 605 into the insulation portions 640 (e.g., expandable polystyrene (EPS) portions) during fabrication of the panels 190. The insulation portions 640 such as EPS may provide substantial structural support in combination with the c-channels 605. In some embodiments, the c-channels 605 may comprise nearly any metal, durable plastic type material, or the like. A heat activated adhesive, as is known to those skilled in the art, may be applied to the vertical support elements or channels such as c-channels 605 prior to a molding cycle to facilitate bonding of the vertical support elements or channels, such as c-channels 605, and the insulating material such as EPS during the molding process. The heat activated adhesive provides substantial bonding strength to the overall panels 190a, 190b. During fabrication or molding, the free flowing insulating material such as EPS may be injected, molded and fused between opposing c-channels 605 located on both sides of the panel 190, and also continuously between the c-channels 605, whereby the insulting material such as EPS may be substantially continuous along the entire length and height of the panel 190 including between the opposing c-channels 605.

The panels 190a, 190b may be constructed to nearly any required dimension in thickness (t), width (w) and length (L). The different dimensions is possible due to the possible choices of dimensionality of the various parts of the dual platen machine 100, as described primarily in reference to FIGS. 5C and 5D above. Common dimensions of panels 190a, 190b include 4, 8, 10 or 12 foot length (L), 4-6 inch thickness (t), and 4-6 feet width (W). However, nearly any dimensionality may be constructed according to the application need and/or customer requirements.

In preparation for the molding process, the c-channels 605 may be placed at any spacing intervals within the movable mold 110 along the inner surface 103, 104, and along the outer surfaces 202, 203 of the stationary mold in preparing for molding cycle. The spacing intervals may be configured at 4 foot centers, for example, or any spacing to imitate common spacing for traditional "studs" ubiquitously employed in traditional stick built construction, for example. Two-foot center-to-center spacing is also quite common, as is 16 inch spacing. Nearly any spacing, including irregular spacing, may be provided. The c-channels 605 may comprise structural members to facilitate attaching finishing materials such as dry wall, panels, wood siding, vinyl siding, fiber-cement such as Hardiplank®, and the like to the finished panels 190a, 190b. A plurality of panels 190 may be arranged in a stacked fashion and/or side-by-side fashion to create a wall section, as required. Such wall section typically has high load bearing capability with a high degree of lateral integrity to resist forces that might causes shifting. and is easy to construct. A wall section made from the plurality of panels 190 typical exceeds load bearing capacity of tradition stick built wall structures, has inherent insulation properties (i.e., no additional insulation would be necessary when compared to stick built construction), and is water resistant. The panels 190 also have an exceedingly long durability expectation (perhaps hundreds of years) if properly installed and when compared with many traditional framed structures.

When finishing a panel after installation, the surfaces of the panel 190 may be covered with stucco, gunite, resins, paints, or similar materials, as needed. The c-channels 605, laterally supported by the insulating material such as EPS, provides substantial weight bearing capability for supporting the building load in general, and to provide attachment capability for siding materials.

A tongue side 610 and a groove side 620 may be formed along the length (L) of the panel 190, and configured to form a tongue-in-groove assembly when two or more panels 190 are arranged side-by-side, to form a wall section. The tongue side 610 may be configured to mate with the groove side 620 of another panel. When so mated, an optional vertical chase (when installed) may be formed between the respective tongue side 610 edge and the groove side 620 edge as an optional interior vertical chase along the length (L) of the mated panels 190. The optional vertical chase may be about one-half to about one inch in width (i.e., the gap width created between the lateral tongue edge and lateral groove edge when mated).

A horizontal chase 630 (as viewed when panels 190a and/or 190b are installed) may be formed during the molding fabrication process by insertion of an elongated tube into one or more retaining sockets 226, as described previously, and may be configured to extend from the tongue side 610 to the groove side 620, through the interior of the panel 190. The horizontal chase 630 may be about 1½ inches in diameter, but any diameter suitable for a particular application may be constructed. This horizontal chase 630 may provide for wiring runs to be inserted into or through the panel 190 at the building site to provide power and/or communications, for example. A chase 630 of one panel 190 may align with the chase of an adjacent panel 190, so that wiring may run substantially unimpeded through multiple panels 190. The horizontal chase 630 may be configured with a tapered opening 615, as a lead-in for aiding in guiding inserted wires into the horizontal chase 630, also assisting running of the wire from one panel 190 to an adjacent panel 190. Acoustic ridges 625 may be formed in the panels 190 to aid in reducing sound propagation when installed.

The insulation material portions 640 (e.g., EPS portions) of the panels 190 may be molded to hold c-channels 605 in place relative to one another using molding techniques of various types. The insulation material portions 640 provide substantial structural strength in combination with the c-channels 605.

Prior to a molding cycle, the c-channels 605 may be manually placed into the dual platen molding machine 100 and held in place by magnetic retainers that hold the metal c-channels 605 in place during the molding operations. The c-channels may be positioned along the inside face of the stationary mold 105 and also along the inner face of the movable mold 110, held by retaining mounts (not shown). In some embodiments, the stationary mold 105 and/or movable mold 110 may be magnetized so that the c-channels may be held in place. The c-channels may be oriented along the length L of the mold's lateral expanse.

Alternatively, when the stationary mold 105 is made from a non-magnetic material such as aluminum, a magnetic retaining mechanism (not shown), e.g., a magnetic bar, may be configured within one or more of the vertical core tubes 210 (e.g.,. the magnetic bar(s) may run from top to bottom within the vertical core tubes 210) so that the c-channels 605 may be held in place against the walls of the stationary mold 105. In some embodiments, the magnetic retaining mechanism may be electromagnet that may be activated electrically to hold the c-channels 605 in place during a molding cycle, and may be optionally controlled to reverse magnetic polarity to aid in ejecting a produced pre-insulated building panel since the reversal of polarity may repel the temporarily magnetized c-channel.

Moreover, in some embodiments, at least one of the movable mold and the stationary mold may be configured with steam vents, while the other does not. In most applications, it is contemplated that both molds would be configured with steam vents.

The cycle time for producing pre-insulated building panels using the dual platen molding machine 100 may vary according to operating parameters, but may range from about 3 minutes to 5 minutes, but is not limited to such range. However, the output of the cycle may produce two pre-insulated building panels, one from each side, which is double the amount produced in one cycle of commonly known molding machines, prior to the invention.

While the invention has been described in terms of exemplary embodiments, those skilled in the art will recognize that the invention can be practiced with modifications in the spirit and scope of the appended claims. These examples given above are merely illustrative and are not meant to be an exhaustive list of all possible designs, embodiments, applications or modifications of the invention. Moreover, U.S. Provisional Application No. 61/148,267, filed Jan. 29, 2009, and U.S. Pat. No. 4,284,447, are incorporated by reference herein in their entirety.

What is claimed:

1. An apparatus for molding a pre-insulated building component, comprising:
 a stationary mold having a first vertical wall and a second vertical wall, the first and second vertical walls extending an entire length of the stationary mold and spaced apart by two first end caps positioned at opposite ends of the stationary mold, the first vertical wall and the second vertical wall each comprising a plurality of adjacent individual vertical hollow core tubes to create a surface of the first vertical wall and a surface of the second vertical wall, each vertical hollow core tube having a plurality of vent holes;
 a movable mold having a top cap, a first side wall spaced apart from a second side wall by two second end caps positioned at opposite ends of the movable mold, the top cap connected to each of the side walls and the two end caps, the movable mold configured to move in a vertical direction to engage the stationary mold to create a plurality of cavities within the movable mold including a first cavity positioned between the first vertical wall and the first side wall and a second cavity positioned between the second vertical wall and the second side wall, each cavity configured to receive fusable insulating material,wherein the first sidewall and the second sidewall each comprising a plurality of adjacent individual tubes with a plurality of steam vents;
 a base attached perpendicular to the first vertical wall, the second vertical wall and the two end caps, and the base configured to engage with the movable mold to enclose the first cavity and second cavity, wherein the base is configured with steam holes to vent steam into the plurality of vertical hollow core tubes;
 wherein the plurality of vent holes are configured to provide steam into the plurality of cavities to fuse the fusable insulating material to create a building panel with fused insulating material.

2. The apparatus of claim 1, wherein the stationary mold is configured with the plurality of vent holes on two opposing surfaces, the opposing surfaces each forming a wall of a separate cavity of the plurality of cavities.

3. The apparatus of claim 1, wherein the movable mold is configured with the plurality of steam vents on two opposing sides, the two opposing sides forming a wall of a separate cavity of the plurality of cavities, and the movable mold and the stationary mold each configured to provide at least one wall for each of the plurality of cavities.

4. The apparatus of claim 1, further comprising a source of fusable insulating material to fill the plurality of cavities, the source connected to the movable mold.

5. The apparatus of claim 1, wherein the fusable insulating material comprises expandable polystyrene (EPS).

6. The apparatus of claim 1, further comprising a frame for guiding the movable mold to engage the stationary mold, the movable mold propelled using electric motors.

7. The apparatus of claim 1, further comprising means to configure a horizontal chase in the building panel.

8. The apparatus of claim 1, further comprising means to configure a vertical support element in the building panel.

9. The apparatus of claim 1, further comprising valves to control venting of the steam into the stationary and movable molds.

10. The apparatus of claim 1, further comprising at least one insert for reducing a size of the cavity.

11. The apparatus of claim 1, further comprising means for configuring a vertical chase in the building panel.

12. The apparatus of claim 1, wherein the stationary mold and the movable mold each comprises the plurality of individual tubes, the steam vents configured in the plurality of individual tubes.

13. An apparatus for molding a pre-insulated building component, comprising:
a stationary mold having a first vertical wall and a second vertical wall, the first and second vertical walls each comprising a plurality of individual vertical hollow core tubes arranged adjacent to one another to form at least two walls of the stationary mold, each vertical hollow core tube configured with a plurality of vent holes, and the stationary mold having a base;
a movable mold configured with a first side wall and a second side wall and the movable mold configured to move in a vertical direction to engage the base of the stationary mold and to enclose the plurality of hollow core tubes of the stationary mold and to create a plurality of cavities within the movable mold including a first cavity created between the first vertical wall and the first side wall and a second cavity created between the second vertical wall and the second side wall, each cavity configured to receive fusable insulating material, wherein the first sidewall and the second sidewall each comprising a plurality of adjacent individual tubes with a plurality of steam vents; and
a hopper configured to store the fusable insulating material for supplying the fusable insulating material to the plurality of cavities, the hopper configured to be in operational proximity with the movable mold and configured to move vertically along with the movable mold,
wherein the base is configured with a plurality of steam holes to vent steam into the plurality of vertical hollow core tubes for directing steam into the plurality of cavities
to create a plurality of insulated building panels during a molding cycle.

14. The apparatus of claim 13, wherein the insulating material comprises expandable polystyrene (EPS).

15. The apparatus of claim 13, further comprising means to construct a horizontal chase in the plurality of insulated building panels.

16. The apparatus of claim 13, further comprising means to construct contours on at least one edge of the plurality of building panels.

17. The apparatus of claim 13, further including an optical safety curtain to detect a safety violation and to stop movement of the movable mold.

18. The apparatus of claim 13, further comprising a magnetic retaining mechanism to hold one or more vertical support elements in place along the surface of the movable mold and the stationary mold during the molding cycle.

19. The apparatus of claim 1, wherein the stationary mold comprises four sides with at least two of the four sides being configured with the plurality of vertical hollow core tubes, each vertical hollow core tube configured with the plurality of vent holes, wherein the movable mold comprises four sides that create a hollow cavity, and the movable mold being configured to engage the stationary mold to create the plurality of cavities, wherein the stationary mold is configured to engage the hollow cavity to create the plurality of cavities by dividing the hollow cavity.

20. The apparatus of claim 1, wherein the stationary mold comprises the plurality of vertical hollow core tubes arranged adjacent to one another to form at least two walls of the stationary mold, and each core tube extending from the base forming one side of the stationary mold to a top cap of the stationary mold, each core tube configured with a plurality of steam vents.

21. The apparatus of claim 20, further comprising the base, the base configured with a plurality of steam holes to provide steam to the plurality of core tubes.

22. The apparatus of claim 21, wherein the base is configured to provide steam to the movable mold.

23. The apparatus of claim 1, wherein the movable mold comprises the plurality of vertical hollow core tubes arranged adjacent one another to form at least two of four walls of the movable mold, the plurality of core tubes each configured with the plurality of steam vents, the four walls and a top cap of the movable mold defining a movable cavity.

24. The apparatus of claim 23, wherein the stationary mold comprises a plurality of vertical hollow core tubes arranged adjacent to one another to form at least two walls of the stationary mold, and each vertical hollow core tube extending from the base forming one side of the stationary mold to a top cap of the stationary mold.

25. The apparatus of claim 23, wherein the stationary mold is configured to divide the movable cavity, in a mated configuration.

26. The apparatus of claim 1, wherein at least one of the stationary mold and the movable mold are configured to magnetically retain at least one vertical support channel within the plurality of cavities for holding the at least one vertical support channel during a molding process.

27. The apparatus of claim 13, wherein at least one of the stationary mold and the movable mold are configured to magnetically hold a vertical channel in place during a molding cycle steam to create the plurality of insulated building panels.

28. The apparatus of claim 13, further comprising:
a first male tongue configured to be placed along the horizontal extent of the movable mold, the first male tongue configured to form a first bevel feature on one corner of the building panel; and
a second male tongue configured along the horizontal extent of the stationary mold, the second male tongue configured to form a second bevel feature on another corner of the building panel.

29. The apparatus of claim 20, wherein said plurality of vertical hollow core tubes are configured with a magnetic retaining mechanism therewithin to magnetically hold a vertical channel in place during a molding cycle.

30. The apparatus of claim 1, wherein the plurality of cavities are each configured to create a building panel that may have a length of one of: about 4 foot, about 8 foot, about 10 foot and about 12 foot.

31. The apparatus of claim 13, wherein the plurality of cavities are each configured to create a building panel that may have a length of one of: about 4 foot, about 8 foot, about 10 foot and about 12 foot.

32. The apparatus of claim 13, wherein the plurality of insulated building panels are ejectable away from the stationary mold in a horizontal direction.

33. The apparatus of claim 1, further comprising a steam chest located below the stationary mold to provide steam to the plurality of vertical hollow core tubes through the base.

34. The apparatus of claim 1, further comprising a hopper configured to store the fusable insulating material for supplying the fusable insulating material to the plurality of cavities, the hopper configured to be in operational proximity with the movable mold and configured to move vertically along with the movable mold.

\* \* \* \* \*